US011560973B2

(12) United States Patent
Post

(10) Patent No.: US 11,560,973 B2
(45) Date of Patent: Jan. 24, 2023

(54) FLEXIBLE WELLHEAD CONNECTION SYSTEMS AND METHODS

(71) Applicant: FORUM US, INC., Houston, TX (US)

(72) Inventor: Steven Post, Fort Worth, TX (US)

(73) Assignee: Forum US, Inc., Houston, TX (US)

( * ) Notice: Subject to any disclaimer, the term of this patent is extended or adjusted under 35 U.S.C. 154(b) by 146 days.

(21) Appl. No.: 16/890,793

(22) Filed: Jun. 2, 2020

(65) Prior Publication Data

US 2021/0372548 A1    Dec. 2, 2021

(51) Int. Cl.
*F16L 27/08* (2006.01)
*E21B 43/26* (2006.01)

(52) U.S. Cl.
CPC .......... *F16L 27/0849* (2013.01); *E21B 43/26* (2013.01); *E21B 43/2607* (2020.05)

(58) Field of Classification Search
CPC ... F16L 27/0849; F16L 27/0824; E21B 43/26; E21B 43/2607; E21B 33/068; E21B 21/02
See application file for complete search history.

(56) References Cited

U.S. PATENT DOCUMENTS 2,753,940 A * 7/1956 Bonner ................... E21B 43/26
166/308.1
10,466,719 B2   11/2019 Kibler et al.

| | | | | |
|---|---|---|---|---|
| 2016/0208570 A1* | 7/2016 | Ayres | .............. | E21B 43/26 |
| 2017/0138144 A1 | 5/2017 | Christopherson et al. | | |
| 2017/0314379 A1 | 11/2017 | Guidry | | |
| 2018/0347286 A1* | 12/2018 | Scott | .............. | E21B 17/05 |
| 2019/0071946 A1* | 3/2019 | Painter | .............. | E21B 43/26 |
| 2019/0302810 A1* | 10/2019 | Kibler | .............. | B25J 15/0019 |
| 2020/0131877 A1 | 4/2020 | Guidry | | |
| 2021/0054727 A1* | 2/2021 | Floyd | .............. | E21B 17/05 |

FOREIGN PATENT DOCUMENTS

WO    2019200083 A1    10/2019

OTHER PUBLICATIONS

International Search Report and Written Opinion dated Aug. 30, 2021 for International Application No. PCT/US2021/034501.
"A Universal Wellhead Connection for Wireline, Frac, and Coiled Tubing." FHE FrackLock, www.builtbyfhe.com/fraclock.html, Last Accessed Mar. 17, 2020.
"FHE FracLock Demonstration", YouTube, Renegade Services, LLC Wireline, Published Sep. 13, 2019, www.youtube.com/watch?v=cPI-AOcCIGA, Last Accessed Mar. 13, 2020.
"FHE FracLock Animation", YouTube, FHE USA, Published Sep. 17, 2019, www.youtube.com/watch?v=-5tHO6hvcLk, Last Accessed Mar. 13, 2020.

(Continued)

*Primary Examiner* — James G Sayre
(74) *Attorney, Agent, or Firm* — Patterson + Sheridan, LLP

(57) ABSTRACT

Aspects of the disclosure relate to flexible wellhead connection systems, apparatus, methods, and associated components thereof. The aspects include a rotatable joint. In one example, the rotatable joint includes a swivel. In one example, the flexible wellhead connection systems, apparatus, and methods are used to connect wellheads to one or more of fluid sources and/or instrumentation skids.

18 Claims, 11 Drawing Sheets

(56) References Cited

OTHER PUBLICATIONS

"FracMaxx™ Big Bore Flowline & QuickLatch™", National Oilweell Varco, Published Aug. 16, 2019, www.youtube.com/watch?v=f_f0w9EmiP4, Last Accessed Mar. 13, 2020.
"ExpressKinect™ Wellhead Connection Unit", Halliburton, Published Mar. 2, 2019, www.fracnews.com/2019/03/02/expresskinect-wellhead-connection-unit/, Last Accessed Mar. 13, 2020.
"ExpressKinect™ Wellhead Connection Unit", Halliburton, Published Oct. 2016.
"The Coflexip® Flexible Line", Technip, Published Sep. 20016, pp. 1-12.
"Dual-connection fracturing fluid delivery technology", Cameron—A Schlumberger Company, Last Accessed Mar. 13, 2020.
"Dual-connection fracturing fluid delivery technology", Schlumberger, www.slb.com/completions/stimulation/frac-and-flowback-equipment/monoflex-technology. Last Accessed Mar. 13, 2020.
Roesner, Thomas G., "Solving Inefficiencies Of Fracturing Fluid Delivery", Hart Energy, Published Nov. 2, 2015, www.hartenergy.com/exclusives/solving-inefficiencies-fracturing-fluid-delivery-175588.
"Flanged-connection fracturing fluid delivery technology", Cameron—A Schlumberger Company, Last Accessed Mar. 13, 2020.
"Flanged-connection fracturing fluid delivery technology", Schlumberger, www.slb.com/completions/stimulation/frac-and-flowback-equipment/monoline-technology. Last Accessed Mar. 13, 2020.

* cited by examiner

FLEXIBLE WELLHEAD CONNECTION SYSTEMS AND METHODS

BACKGROUND

Field

Aspects of the disclosure relate to flexible wellhead connection systems, apparatus, methods, and associated components thereof. In one example, the flexible wellhead connection systems, apparatus, and methods are used to connect wellheads to one or more of fluid sources and/or instrumentation skids.

Description of the Related Art

Conventional wellhead connection systems have several drawbacks. For example, conventional wellhead connection systems may require multiple connection points to make a connection between a manifold and several wellheads. These multiple connection points can have multiple lines that are needed to connect to the wellheads, require increased line lengths, and include large numbers of complex connections that are slow to be disconnected to and from each other. These issues can lead to reduced efficiency, increased costs, increased operational times, increased mobilization of resources, and complexity in design and operations.

Therefore, there is a need for wellhead connection systems and methods that can quickly and effectively establish a connection between a manifold and several wellheads.

SUMMARY

Aspects of the disclosure relate to flexible wellhead connection systems, apparatus, methods, and associated components thereof. In one example, the flexible wellhead connection systems, apparatus, and methods are used to connect wellheads to one or more of fluid sources and/or instrumentation skids.

In one implementation, a flexible wellhead connection apparatus includes a flexible wellhead hose. The flexible wellhead hose includes a first end and a second end. The flexible wellhead connection apparatus includes a connection sub coupled to the first end of the flexible wellhead hose through a connection conduit, and a rotatable joint coupled to the second end of the flexible wellhead hose through an upper fluid conduit.

In one implementation, a flexible wellhead connection system includes a trailer, a crane mounted on the trailer, and a flexible wellhead hose that includes a first end and a second end. The flexible wellhead connection system includes a connection sub coupled to the first end of the flexible wellhead hose through a connection conduit, and a rotatable joint coupled to the second end of the flexible wellhead hose through an upper fluid conduit.

In one implementation, a method of injecting fluid into a plurality of wellheads includes coupling a connection sub coupled to a first end of a flexible wellhead hose to a first wellhead, and pumping fluid through the flexible wellhead hose and into the first wellhead. The method also includes decoupling the connection sub from the first wellhead, and moving the connection sub toward a second wellhead. The moving the connection sub includes rotating a rotatable joint coupled to a second end of the wellhead hose. The method also includes coupling the connection sub to the second wellhead, and pumping fluid through the flexible wellhead hose and into the second wellhead.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1A:
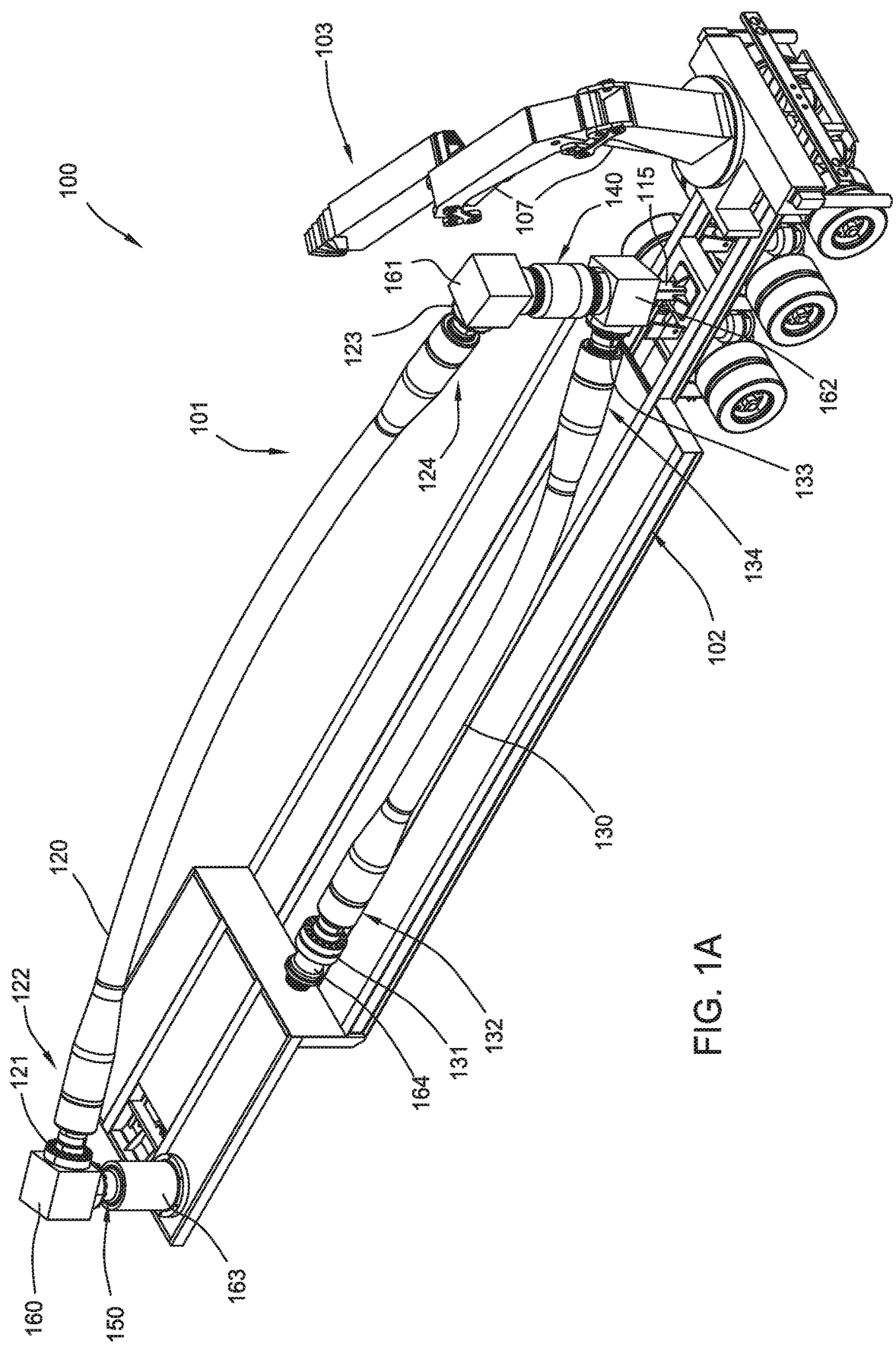
FIG. 1A is a schematic partial view of a flexible wellhead connection system, according to one implementation.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the disclosure relate to flexible wellhead connection systems, apparatus, methods, and associated components thereof. In one example, the flexible wellhead connection systems, apparatus, and methods are used to connect wellheads to one or more of fluid sources and/or instrumentation skids.

The present disclosure contemplates that use of terms such as "coupled," "couples", and/or "coupling," can include direct coupling and/or indirect coupling, such as coupling through other components. The present disclosure also contemplates that use of terms such as "coupled," "couples", and/or "coupling," can include but are not limited to connecting, welding, interference fitting, brazing, and/or fastening using fasteners, such as pins, rivets, screws, bolts, and/or nuts. The present disclosure also contemplates that use of terms such as "coupled," "couples", and/or "coupling," can include but are not limited to components being integrally formed together as a unitary body.

FIG. 1A is a schematic partial view of a flexible wellhead connection system 100, according to one implementation. The wellhead connection system 100 includes a trailer 102 and a wellhead connection apparatus 101 disposed on the trailer 102. The wellhead connection system 100 includes a crane 103 mounted on the trailer 102. The wellhead connection apparatus 101 includes a wellhead hose 120, a second hose 130, a rotatable joint 140, and a connection sub 150. The wellhead hose 120 includes a first flange 121 coupled to a first end 122 of the wellhead hose 120, and a second flange 123 coupled to a second end 124 of the wellhead hose 120. The second hose 130 includes a first flange 131 coupled to a first end 132 of the second hose 130, and a second flange 133 coupled to a second end 134 of the second hose 130.

The wellhead hose 120 is single large bore, high pressure flexible hose. The present disclosure contemplates that the flexible hoses described herein, such as the wellhead hose 120 and the second hose 130, may be referred to as flexible pipes. The references to flexible hoses herein, may include flexible hoses and/or flexible pipes that include bonded and/or non-bonded hose and/or pipe configurations. Other than at the ends of the wellhead hose 120, the body of the wellhead hose 120 between the ends does not include any hard metal sections, such as hard metal connections or hard metal line portions. The wellhead hose 120 can be quickly and easily connected to and from multiple wellheads such as by a latch as further described below. The use of a flexible hose (which may be referred to as a flexible pipe) for the wellhead hose 120 reduces the number of connections that are required for conventional wellhead connection systems that include hard metal connections and lines. The use of a flexible hose allows the wellhead connection system 100 to connect to and from multiple wellheads that are spaced away from each other both horizontally and vertically by allowing the wellhead hose 120 to bend to accommodate for differences in the distance and/or height of the multiple wellheads relative to each other and/or relative to the wellhead connection system 100 and/or the wellhead hose 120 itself. In addition to the wellhead hose 120, the wellhead connection system 100 also includes the rotatable connection 140 (which may include a large bore pressurized swivel as further described below) that can be used to assist with the degrees of freedom that the wellhead hose 120 can be moved, which ultimately reduces the length of the wellhead hose 120 required to make the desired connections, thereby reducing overall cost. The second hose 130 may be the same flexible hose as the wellhead hose 120.

The connection sub 150 is disposed in a mount housing 163 coupled to the trailer 102. The connection sub 150 is coupled to the first end 122 of the wellhead hose 120 through at least a connection conduit 160 (such as a connection block). The connection conduit 160 is coupled to the first flange 121 of the wellhead hose 120. The present disclosure contemplates that the connection conduit 160 may be an integral portion of a component of the connection sub 150 and/or the first flange 121. The rotatable joint 140 is coupled to the second end 124 of the wellhead hose 120 through at least an upper fluid conduit 161. The present disclosure contemplates that the conduits described herein, such as the connection conduit 160 and the upper fluid conduit 161, may include flanges or joints such as block joints and/or elbow joints. As an example, the conduits described herein may include flanged elbow joints and/or cross-blocks. As an example, the conduits described herein may include a flange or a flexible hose that is bolted or welded, such as bolted or welded to an upper sub 141 of the rotatable joint 140. The present disclosure contemplates that the conduits described herein may facilitate a change of direction in a fluid flowing through the respective conduits. In one embodiment, either end of the flexible hose itself may form the fluid conduit, such as the connection conduit 160 and/or the upper fluid conduit 161, so that the flexible hose can be directly connected to the rotatable joint 140, the connection sub 150, and/or any other direct connection point.

The upper fluid conduit 161 is coupled to the second flange 123 of the wellhead hose 120. The present disclosure contemplates that the upper fluid conduit 161 may be an integral portion of a component of the rotatable joint 140 and/or the second flange 123. The rotatable joint 140 is also coupled to the second end 134 of the second hose 130 through at least a lower fluid conduit 162. The lower fluid conduit 162 is coupled to the second flange 133 of the second hose 130. The present disclosure contemplates that the lower fluid conduit 162 may be an integral portion of a component of the rotatable joint 140, the second flange 133, the mount beam 115 (described below), and/or a frame of the trailer 102. In one embodiment, which can be combined with other embodiments, the wellhead connection apparatus 101 includes a second connection sub 164 coupled to the first flange 131 of the second hose 130. In such an embodiment, the second connection sub 164 is similar to the connection sub 150 and includes one or more of the features, components, aspects, and/or properties thereof.

The trailer 102 is used to position the wellhead connection system 100. In one example, the trailer 102 is coupled to a semi-trailer truck and transported to a wellhead site. The trailer 102 may be deployed in relation to the wellhead site. The rotatable joint 140 fluidly connects the second hose 130 to the wellhead hose 120. The rotatable joint 140 facilitates rotation of the wellhead hose 120 relative to the second hose 130, and facilitates rotation of the upper fluid conduit 161 relative to the lower fluid conduit 162. In the implementation shown, the rotatable joint 140 is supported on a mount beam 115. The present disclosure contemplates that one or more of the components may be built into the frame of the trailer 102. The present disclosure also contemplates that the mount beam 115 may be omitted. In one embodiment, which can be combined with other embodiments, the rotatable joint 140 includes a non-pressurized swivel table. In one embodiment, which can be combined with other embodiments, the mount beam 115 is omitted and a second rotatable joint, such as a swivel, is coupled to the lower fluid conduit 162 to facilitate rotation of the lower fluid conduit 162. In one embodiment, which can be combined with other embodiments, the second rotatable joint includes a non-pressurized swivel table. In one embodiment, which can be combined with other embodiments, the second rotatable joint is at least partially built into the frame of the trailer 102.

Figure 1B:
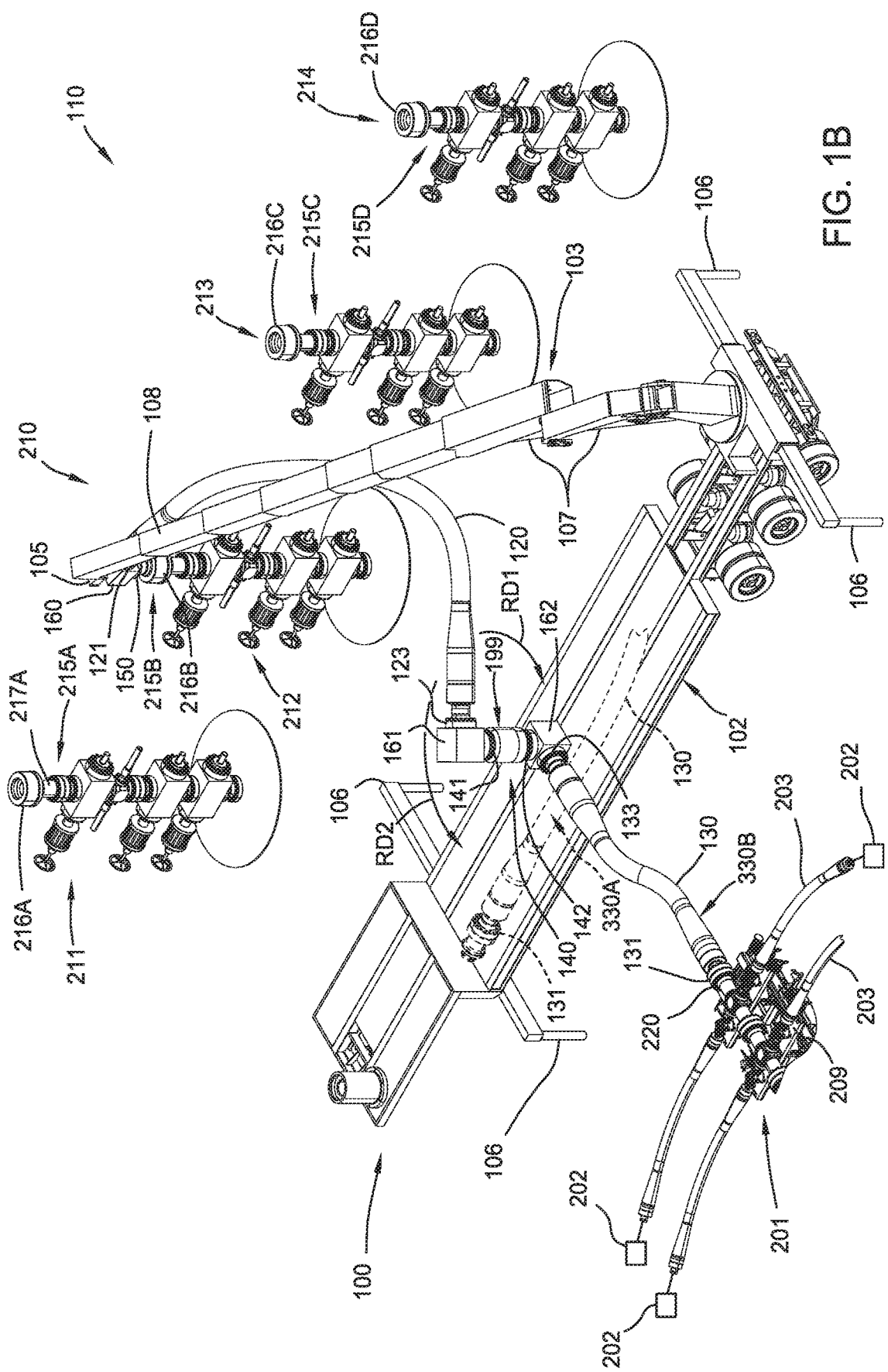
FIG. 1B is a partial schematic illustration of a fluid injection system including the wellhead connection system illustrated in FIG. 1 deployed at a wellhead site, according to one implementation.

FIG. 1B is a partial schematic illustration of a fluid injection system 110 including the wellhead connection system 100 illustrated in FIG. 1A deployed at a wellhead site 210 according to one implementation. The fluid injection system 110 is similar to the fluid injection system 200 described below, and includes one or more of the aspects, features components, and/or properties thereof. In the implementation shown in FIG. 1B, the second flange 133 of the second hose 130 is coupled to the lower fluid conduit 162. Alternatively, an instrumentation skid, such as the instrumentation skid 104 described below, could be disposed on the ground between the first manifold 201 and the trailer 102, such as coupled between the first manifold 201 and the trailer 102 or coupled to equipment not shown. In the implementation shown in FIG. 1B, the mount beam 115 is omitted and the lower fluid conduit 162 is disposed on and supported by the trailer 102. The trailer 102 includes a plurality of legs 106 deployed into engagement with the ground to support and stabilize the trailer 102 during operation of the fluid injection system 110.

The crane 103 mounted to the trailer 102 is used to lift, lower, and move components of the fluid injection system 110. The crane 103 may include a knuckle boom crane. The crane 103 includes a plurality of hydraulic actuators 107 to facilitate operation of the crane 103. The crane 103 includes an arm 105, such as an articulation grappling arm, coupled to a boom 108 of the crane 103 that grips the components of the fluid injection system 110 to move the components. The crane 103 is used to move the second hose 130 from a retracted position 330A (shown in ghost in FIG. 1B) to a deployed position 330B. In the retracted position 330A, the first flange 131 is supported on the trailer 102. In the deployed position 330B, the first flange 131 is coupled to the flange 220 of the first manifold 201, or in the case an instrumentation skid is used, the first flange 131 is coupled to the instrumentation skid. Using the crane 103 to move the second hose 130 from the retracted position 330A to the deployed position 330B, the second hose 130 swings outward and away from the trailer 102 and toward the first manifold 201.

The crane 103 is also used to move the connection sub 150 and the connection conduit 160 between a plurality of wellheads 211-214 and/or between the trailer 102 and the wellheads 211-214 before and after the connection sub 150 is coupled to and decoupled from one of the wellheads 211-214. In one example, the crane 103 is used to lift the connection sub 150 and the connection conduit 160 off of the trailer 102, and move the connection sub 150 and the connection conduit 160 from the trailer 102 and toward a first wellhead 211. As the crane 103 moves the connection conduit 160 and the connection sub 150 toward the first wellhead 211, the wellhead hose 120 swings outward from the trailer 102 and toward the first wellhead 211. The rotatable joint 140 includes a swivel 199. The swivel 199 includes an upper sub 141 and a lower sub 142. As the wellhead hose 120 swings outward, the upper fluid conduit 161 and the upper sub 141 rotate relative to the lower sub 142 and the lower fluid conduit 162 in a first rotational direction RD1. The first rotational direction RD1 is in the horizontal plane.

The crane 103 is then used to lower the connection sub 150 at least partially into a first lock ring assembly 216A and a first sub 217A of a first connection head 215A. The arm 105 may or may not release the connection conduit 160, and the latch 152 engages the first lock ring assembly 216A to couple the connection sub 150 to the first wellhead 211. In one embodiment, which can be combined with other embodiments, the arm 105 does not release the connection conduit 160 as the connection conduit 160 is moved between the wellheads 211-214 and connects to and disconnects from the connection heads 215A-215D. A first manifold 201 and a second manifold 204 are then used to pump fluid through the second hose 130, through the rotatable joint 140, through the wellhead hose 120, and into the first well through the first wellhead 211. After the pumping operations for the first wellhead 211 are complete, the latch 152 is disengaged from the first lock ring assembly 216A to decouple the connection sub 150 from the first wellhead 211. The arm 105 of the crane 103 grips the connection conduit 160. The crane 103 is used to lift the connection sub 150 out of the first connection head 215A and move the connection conduit 160 and the connection sub 150 from the first wellhead 211 and toward a second wellhead 212 to pump fluid into the second well through the second wellhead 212. As the connection conduit 160 and the connection sub 150 move from the first wellhead 211 and toward the second wellhead 212, the wellhead hose 120 swings from the first wellhead 211 and toward the second wellhead 212, and the upper sub 141 and upper fluid conduit 161 rotate in the first rotational direction RD1.

The upper fluid conduit 161 and the upper sub 141 are also rotatable relative to the lower sub 142 and the lower fluid conduit 162 in a second rotational direction RD2 that is opposite of the first rotational direction RD1. The second rotational direction RD2 is in the horizontal plane. In one example, the upper fluid conduit 161 and the upper sub 141 rotate relative to the lower sub 142 and the lower fluid conduit 162 in the second rotational direction RD2 when the crane 103 is used to move the connection conduit 160 and the connection sub 150 from the first wellhead 211 and back to the trailer 102.

As the crane 103 is used to move the second hose 130 from the retracted position 330A to the deployed position 330B, the lower sub 142 and the lower fluid conduit 162 rotate relative to the upper sub 141 and the upper fluid conduit 161 in the second rotational direction RD2. In one embodiment, which can be combined with other embodiments, a second rotatable joint (such as the second rotatable joint described in relation to FIG. 1A), such as a swivel, is coupled to the lower fluid conduit 162 to facilitate rotation of the lower fluid conduit 162. In one embodiment, which can be combined with other embodiments, the second rotatable joint includes a non-pressurized swivel table. In one embodiment, which can be combined with other embodiments, the second rotatable joint is at least partially built into the frame of the trailer 102.

The upper sub 141 of the rotatable joint 140 is rotatable by at least 15 degrees relative to the lower sub 142. In one embodiment, which can be combined with other embodiments, the upper sub 141 of the rotatable joint 140 is rotatable by 360 degrees relative to the lower sub 142. The lower sub 142 of the rotatable joint 140 is rotatable by at least 15 degrees relative to the upper sub 141. In one embodiment, which can be combined with other embodiments, the lower sub 142 of the rotatable joint 140 is rotatable by 360 degrees relative to the upper sub 141.

Figure 1C:
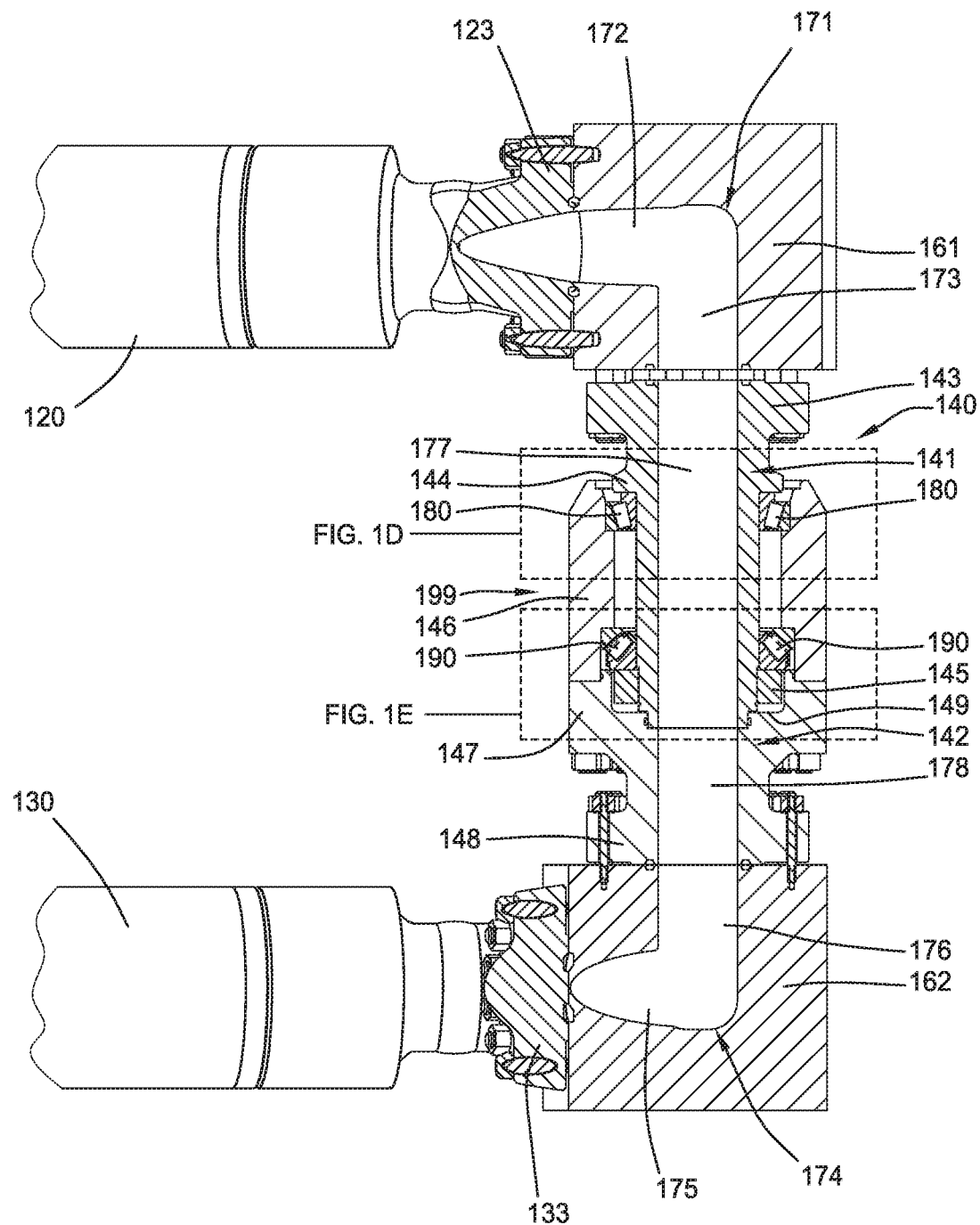
FIG. 1C is a schematic partial cross-sectional illustration of a swivel of a rotatable joint with a second flange of a second hose coupled to a lower fluid conduit, as illustrated in FIG. 1B, according to one implementation.

FIG. 1C is a schematic partial cross-sectional illustration of the swivel 199 of the rotatable joint 140 with the second flange 133 of the second hose 130 coupled to the lower fluid conduit 162, as illustrated in FIG. 1B, according to one implementation. The upper fluid conduit 161 includes a fluid opening 171. The fluid opening 171 includes a horizontal section 172 and a vertical section 173. The horizontal section 172 and the vertical section 173 intersect to form an L-shaped fluid opening 171. The lower fluid conduit 162 includes a fluid opening 174. The fluid opening 174 includes a horizontal section 175 and a vertical section 176. The horizontal section 175 and the vertical section 176 intersect to form an L-shaped fluid opening 174. The present disclosure contemplates that the horizontal section 172 may be replaced with a second vertical section or an oblique section, and/or that the vertical section 173 may be replaced with a second horizontal section. The oblique section 172 is disposed at an oblique angle A1.

The upper sub 141 includes an upper flange 143 and an upper shoulder 144. A support ring 145 is coupled to the upper sub 141 below the upper flange 143 and below the upper shoulder 144. The swivel 199 of the rotatable joint 140 includes a bearing housing 146 coupled to the lower sub 142. The swivel 199 also includes an upper set of one or more bearings 180 disposed between the upper sub 141 and the bearing housing 146, and a lower set of one or more bearings 190 disposed between the upper sub 141 and the bearing housing 146. The lower sub 142 includes an upper flange 147 coupled to the bearing housing 146 and a lower flange 148 coupled to the lower fluid conduit 162. A lower end of the upper sub 141 is disposed into engagement with a recessed surface 149 formed in an upper end of the lower sub 142. The upper sub 141 includes a fluid opening 177 formed longitudinally therethrough and the lower sub 142 includes a fluid opening 178 formed longitudinally therethrough.

Figure 1D:
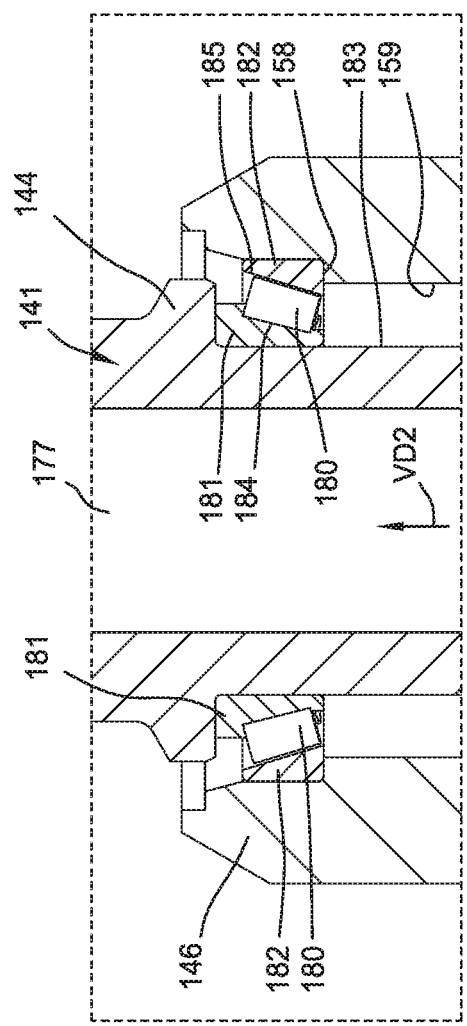
FIG. 1D is an enlarged schematic partial illustration of the rotatable joint illustrated in FIG. 1C, according to one implementation.

FIG. 1D is an enlarged schematic partial illustration of the rotatable joint 140 illustrated in FIG. 1C, according to one implementation. The upper set of one or more bearings 180 (a plurality of bearings 180 are shown) are disposed between an upper inner ring 181 and an upper outer ring 182. The upper inner ring 181 is disposed on an outer surface 183 of the upper sub 141 and in engagement with the upper shoulder 144. The upper inner ring 181 is coupled to the upper sub 141. The upper inner ring 181 includes an outer surface 184. The bearing housing 146 includes an inner surface 159 and an upper shoulder 158 formed in the inner surface 159. The upper outer ring 182 includes an inner surface 185. The inner surface 184 and the outer surface 185 are tapered or curved, such as spherically curved. The bearings 180 are disposed between and in engagement with the outer surface 184 and the inner surface 185. The upper outer ring 182 is coupled to the bearing housing 146 and is disposed in engagement with the upper shoulder 158 formed in the inner surface 159. The upper inner ring 181 and the upper outer ring 182 are disposed between the upper sub 141 and the bearing housing 146. The bearings 180 of the upper set of bearings 180 are disposed at an angle relative to the fluid opening 177 of the upper sub 141. The bearings 180 of the upper set of bearings 180 are disposed at a first angle that angles inward toward the fluid opening 177 in a downward vertical direction VD1. The bearings 180 may be disposed parallel to the fluid opening 177. The rings 181, 182 are bearing races. The upper inner ring 181 may be integrally formed with the upper sub 141 and/or the upper outer ring 182 may be integrally formed with the bearing housing 146.

Figure 1E:
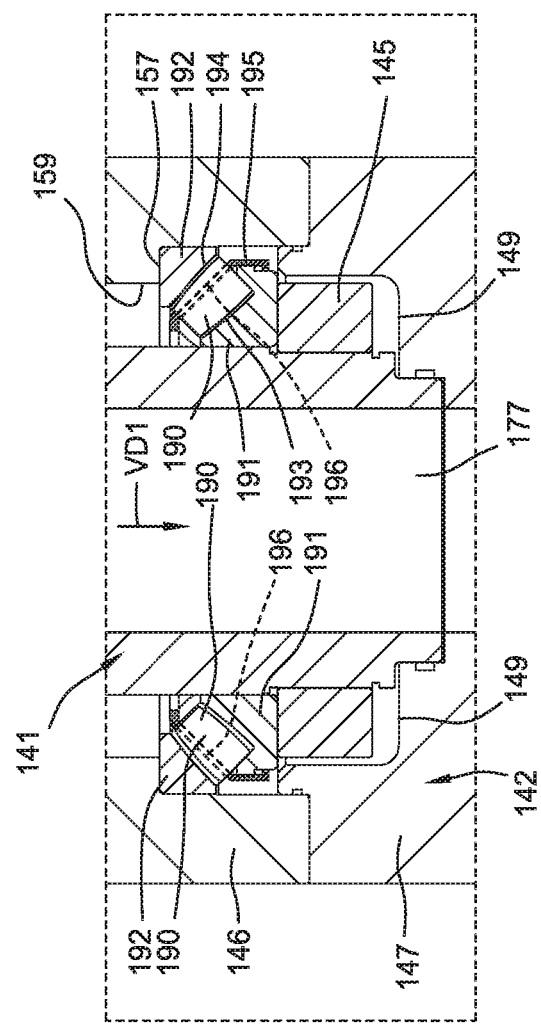
FIG. 1E is an enlarged schematic partial illustration of the rotatable joint illustrated in FIG. 1C, according to one implementation.

FIG. 1E is an enlarged schematic partial illustration of the rotatable joint 140 illustrated in FIG. 1C, according to one implementation. The bearing housing 146 includes a lower shoulder 157 formed in the inner surface 159. The lower set of one or more bearings 190 (a plurality of bearings 190 are shown) are disposed between a lower inner ring 191 and a lower outer ring 192. The lower inner ring 191 is coupled to the upper sub 141. The lower inner ring 191 is disposed in engagement with the support ring 145 coupled to the upper sub 141. The lower outer ring 192 is coupled to the bearing housing 146. The lower outer ring 192 is disposed in engagement with the lower shoulder 157. The lower inner ring 191 and the lower outer ring 192 are disposed between the bearing housing 146 and the upper sub 141. The lower inner ring 191 includes an outer surface 193 and the lower outer ring 192 includes an inner surface 194. The inner surface 144 and the outer surface 193 are tapered or curved, such as spherically curved.

The lower set of bearings 190 are disposed between the lower inner ring 191 and the lower outer ring 192. The lower set of bearings are disposed between and in engagement with the outer surface 193 and the inner surface 194. A retainer ring 195 is disposed between the lower inner ring 191 and the lower outer ring 192. The retainer ring 195 is coupled to the lower inner ring 191. The retainer ring 195 includes one or more bars 196 that extend between the bearings 190 and/or extend through the bearings 190 to retain the bearings 190. The bearings 190 of the lower set of bearings 190 are disposed at an angle relative to the fluid opening 177 of the upper sub 141. The bearings 190 of the lower set of bearings 190 are disposed at a second angle that angles inward toward the fluid opening 177 in an upward vertical direction VD2.

The upper set of bearings 180 are configured to roll along the outer surface 184 and/or the inner surface 185 to facilitate rotation of the upper sub 141 relative to the lower sub 142. The lower set of bearings 190 are configured to roll along the outer surface 193 and/or the inner surface 194 to facilitate rotation of the upper sub 141 relative to the lower sub 142. The retainer ring 195 retains the lower set of bearings 190 in a fixed position relative to the upper sub 141 as the upper sub 141 rotates relative to the bearing housing 146 and the lower sub 142. In one example, the upper sub 141 rotates relative to the lower sub 142 and the bearing housing 146, and the upper set of bearings 180 roll along the inner surface 185 and the lower set of bearings 190 roll along the inner surface 194. The rings 191, 192 are bearing races. The lower inner ring 191 may be integrally formed with the upper sub 141 and/or the lower outer ring 192 may be integrally formed with the bearing housing 146 and/or the lower sub 142. The bearing housing 146 may be integrally formed with the lower sub 142. The support ring 145 may be integrally formed with the upper sub 141, the lower sub 142, and/or the bearing housing 146.

Figure 2A:
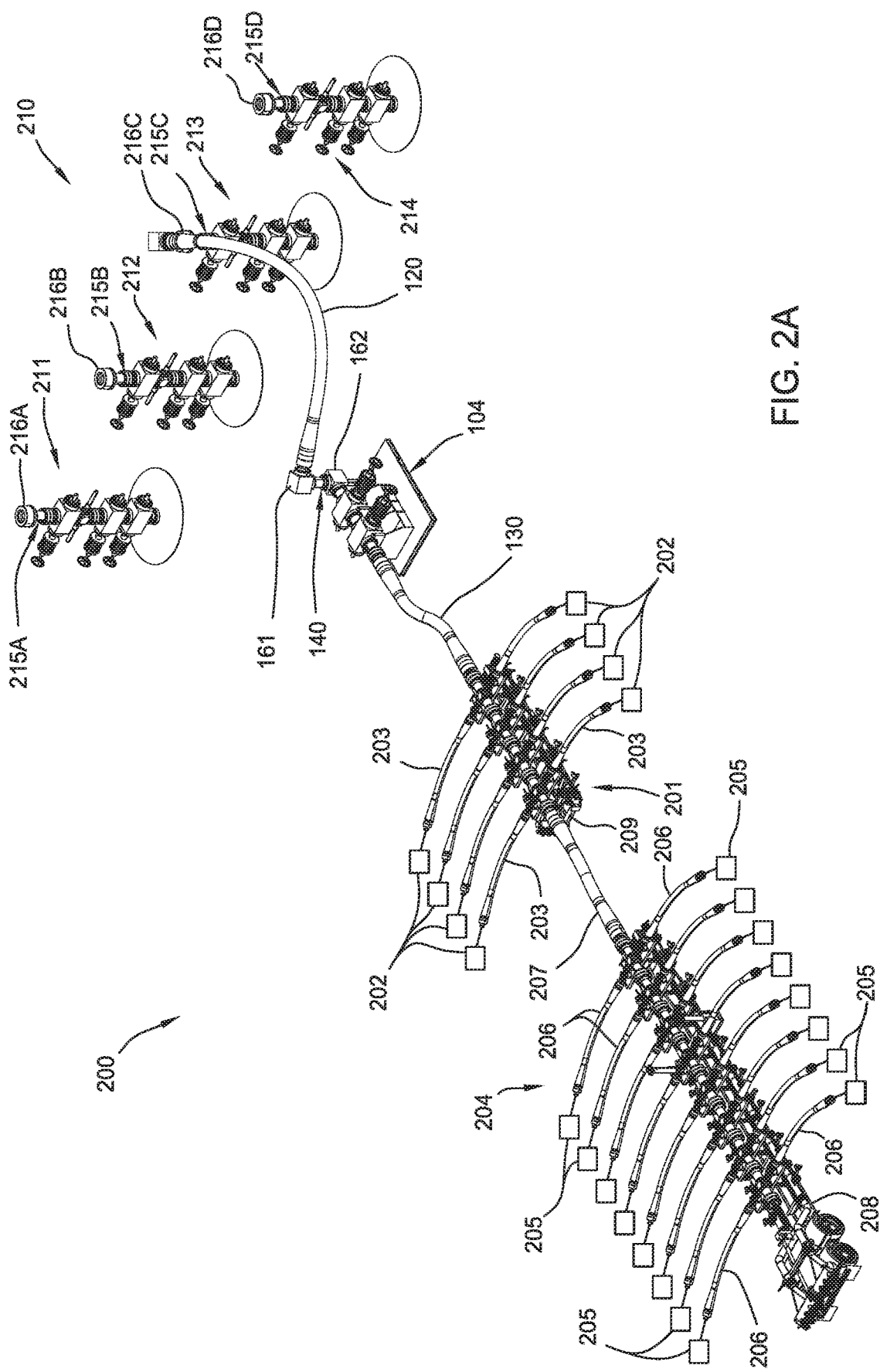
FIG. 2A is a schematic partial illustration a fluid injection system deployed at a wellhead site, according to one implementation.

FIG. 2A is a schematic partial illustration of a fluid injection system 200 deployed at a wellhead site 210, according to one implementation. The fluid injection system 200 uses one or more aspects of the wellhead connection system 100 illustrated in FIG. 1A. The fluid injection system 200 includes an instrumentation skid 104. The present disclosure contemplates that the instrumentation skid 104 may not be transported on the same trailer 102 as the wellhead connection system 100 illustrated in FIG. 1A but may still be installed with components of the wellhead connection system 100 at wellheads. The wellhead site 210 includes a plurality of wellheads 211-214 (four are shown). The plurality of wellheads 211-214 includes a first wellhead 211, a second wellhead 212, a third wellhead 213, and a fourth wellhead 214. Each wellhead of the plurality of wellheads 211-214 may include, for example, a Christmas tree. The plurality of wellheads 211-214 includes a first connection head 215A having a first lock ring assembly 216A, a second connection head 215B having a second lock ring assembly 216B, a third connection head 215C having a third lock ring assembly 216C, and a fourth connection head 215D having a fourth lock ring assembly 216D.

The first end 122 of the wellhead hose 120 is shown coupled to the third wellhead 213 through the connection sub 150. The second end 124 of the wellhead hose 120 is coupled to the instrumentation skid 104 through the rotatable joint 140. In the implementation illustrated in FIG. 2A, the second connection sub 164 is omitted. The first end 132 of the second hose 130 is coupled to a first manifold 201 through the first flange 131, and the second end 134 of the second hose 130 is coupled to the instrumentation skid 104 through the second flange 133. In such an embodiment, the second hose 130 is a manifold hose. The present disclosure contemplates that the first end 132 of the second hose 130 can be coupled to a fluid source (such as one or more pods fluidly connected to pumps, or one or more valves fluidly connected to pumps) other than manifolds such as the first manifold 201 and the second manifold 204. The present disclosure contemplates that the second hose 130 may be coupled to the first manifold 201 through the first flange 131 and the second connection sub 164. The first manifold 201 includes a plurality of first pumps 202 coupled to the first manifold 201 through a plurality of first pump hoses 203 to pump a fluid into the first manifold 201. The fluid injection system 200 includes a second manifold 204. The second manifold 204 includes a plurality of second pumps 205 coupled to the second manifold 204 through a plurality of second pump hoses 206 to pump a fluid into the second manifold 204. The present disclosure contemplates that the hoses 203, 206 may not be used. A connection hose 207 is coupled between the first manifold 201 and the second manifold 204 to supply the fluid pumped by the second pumps 205 from the second manifold 204 and into the first manifold 201. The second manifold 204 is supported on a trailer 208 and the first manifold 201 is supported on a pump skid 209. The present disclosure contemplates that the instrumentation skid 102 may be a part of one or more of the manifolds 201, 204.

The wellhead connection system 100 is deployed during a method of using the fluid injection system 200 to inject a fluid into the third wellhead 213. The fluid may include, for example, a well stimulation fluid or a hydraulic fracturing fluid. The fluid pumped into the second manifold 204 by the second pumps 205 and the fluid pumped into the first manifold 201 by the first pumps 202 is pumped through the second hose 130, and through the instrumentation skid 104. The fluids pumped through instrumentation skid 104 are pumped through the rotatable joint 140, through the wellhead hose 120, through the connection sub 150, and into the third wellhead 213.

Figure 2B:
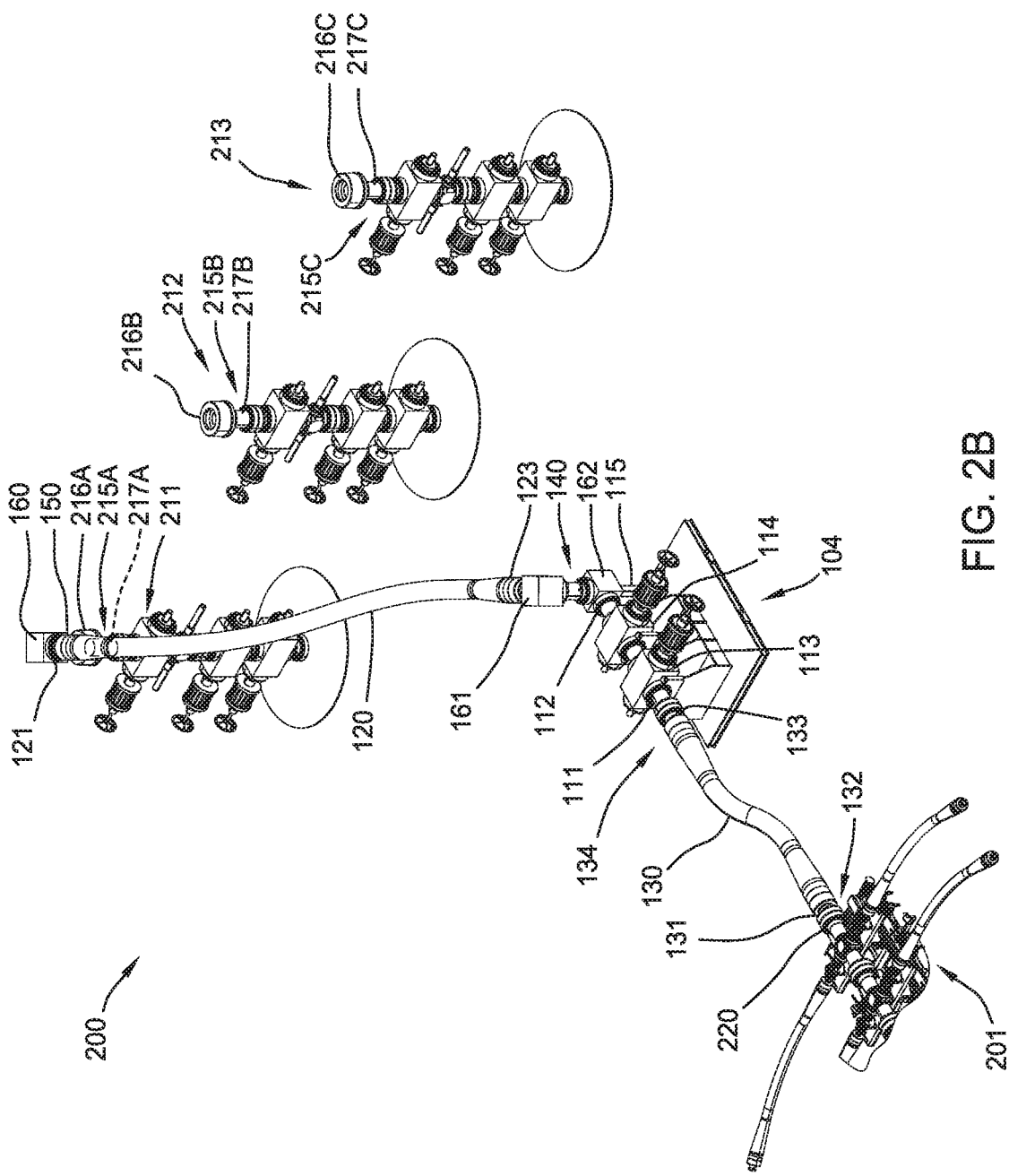
FIG. 2B is an enlarged partial schematic view of the fluid injection system illustrated in FIG. 2A with a connection sub coupled to a first wellhead, according to one implementation.

FIG. 2B is an enlarged partial schematic view of the fluid injection system 200 illustrated in FIG. 2A with the connection sub 150 coupled to the first wellhead 211, according to one implementation. The fluid injection system 200 including the wellhead connection system 100 is used to inject fluid into a first well through the first wellhead 211. The first manifold 201 includes a flange 220 coupled to the first flange 131 of the second hose 130. The instrumentation skid 104 includes a first flange 111 coupled to the second flange 133 of the second hose 130 and a second flange 112 coupled to the lower fluid conduit 162 coupled to the rotatable joint 140. The instrumentation skid 104 includes a first valve 113 and a second valve 114. The first and second valves 113, 114 may include one or more of a gate valve, a ball valve, a globe valve, and/or a check valve such as a swing check valve and/or a dart check valve. One or more additional valves may be used in addition to the first and second valves 113, 114. The first and second valves 113, 114 may act as shut-off valves for the fluid flowing from the second hose 130 and toward the wellhead hose 120. In the implementation illustrated in FIG. 2B, the second end 134 of the second hose 130 is fluidly connected to the lower fluid conduit 162 through at least the instrumentation skid 104, and the second hose 130 is fluidly connected to the rotatable joint 140 through at least the instrumentation skid 104 and the lower fluid conduit 162.

According to a method of injecting fluid into the plurality of wellheads 211-214, the connection sub 150 is coupled to the first connection head 215A of the first wellhead 211 to inject fluid into the first well through the first wellhead 211. In one embodiment, which can be combined with other embodiments, the coupling of the connection sub 150 with the first connection head 215A includes disposing the connection sub 150 at least partially within a first sub 217A of the first connection head 215A and at least partially within the first lock ring assembly 216A. The coupling of the connection sub 150 with the first connection head 215A also includes engaging the connection sub 150 with the first lock ring assembly 216A. The first pumps 202 and the second pumps 205 are then used to pump the fluid through the second hose 130, through the wellhead hose 120, through the first wellhead 211, and into the first well. Each of the second hose 130 and the wellhead hose 120 may include a flexible hose that includes one or more bend radii during operation. The present disclosure contemplates that one or more aspects of the fluid injection system 200 may be omitted. As an example, the second hose 130 may be omitted such that a spool, such as an instrumentation spool, or an iron pipe is ran from the fluid sources (such as the first manifold 201) to the instrumentation skid 104 and/or the lower fluid conduit 162 to supply fluid from fluid sources to the wellhead hose 120.

Figure 2C:
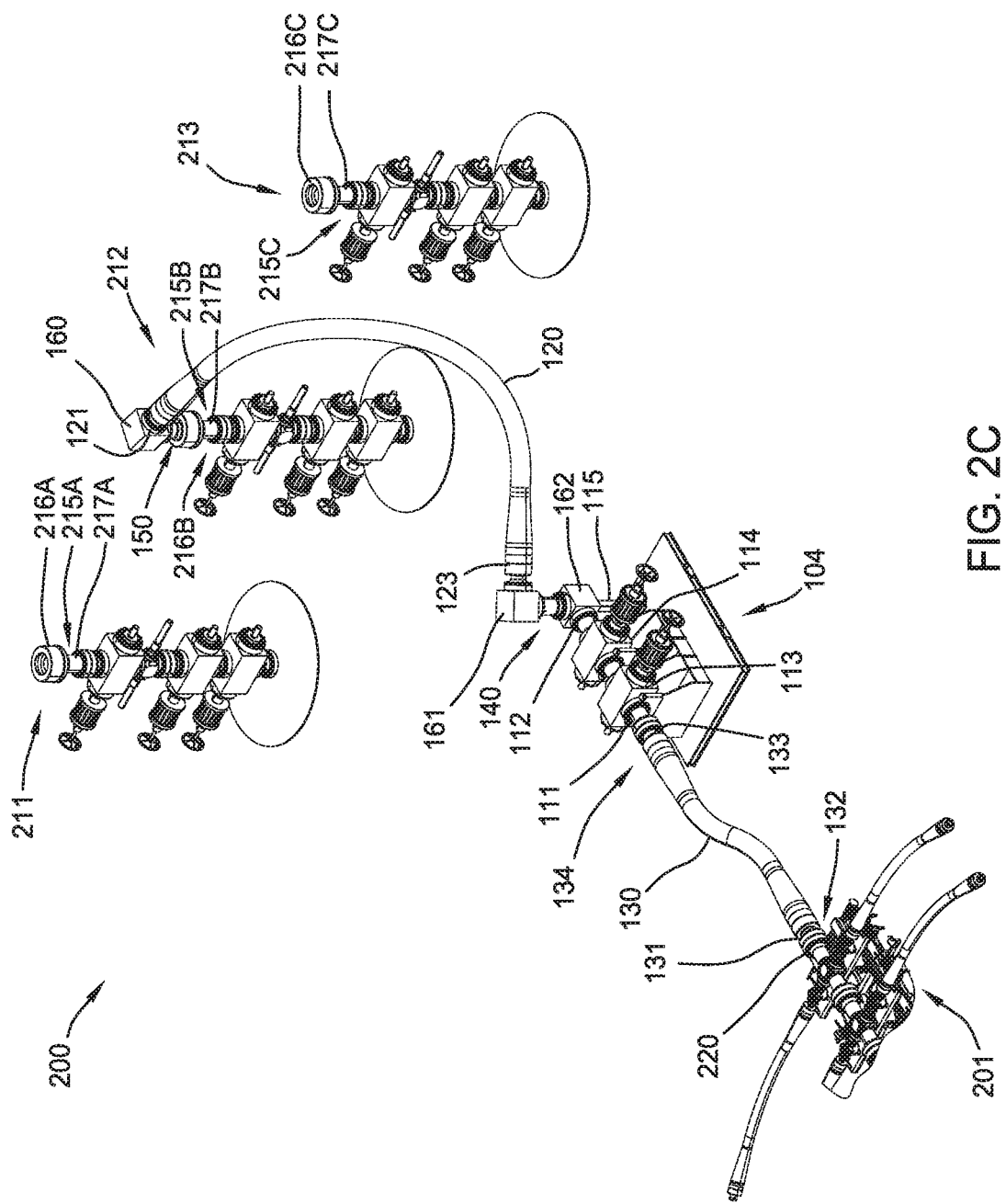
FIG. 2C is a partial schematic view of the fluid injection system illustrated in FIG. 2B with the connection sub coupled to a second wellhead, according to one implementation.

FIG. 2C is a partial schematic view of the fluid injection system 200 illustrated in FIG. 2B with the connection sub 150 coupled to the second wellhead 212, according to one implementation. According to a method of injecting fluid into the plurality of wellheads 211-214, the connection sub 150 is coupled to the second connection head 215B of the second wellhead 212 to inject fluid into the second well through the second wellhead 212. The first pumps 202 and the second pumps 205 are then used to pump the fluid through the second hose 130, through the wellhead hose 120, through the second wellhead 212, and into the second well.

According to the method, the connection sub 150 is decoupled from the first connection head 215A of the first wellhead 211 after pumping the fluid through the first wellhead 211 (as described in relation to FIG. 2B). The decoupling of the connection sub 150 from the first connection head 215A includes disengaging the connection sub 150 from the first lock ring assembly 216A. The decoupling of the connection sub 150 from the first connection head 215A also includes moving the connection sub 150 outside of the first lock ring assembly 216A and the first sub 217A. The connection conduit 160 and the connection sub 150 are then moved away from the first wellhead 211 and toward the second wellhead 212. While the connection conduit 160 and the connection sub 150 are moved toward the second wellhead 212, the wellhead hose 120 and the upper fluid conduit 161 are rotated relative to the lower fluid conduit 162 using the rotatable joint 140. The lower fluid conduit 162 is supported on a mount beam 115 coupled to the instrumentation skid 104. The wellhead hose 120 and/or the upper fluid conduit 161 rotate by at least 15 degrees in a horizontal plane while the connection sub 150 and the connection conduit 160 are moved from the first wellhead 211 and to the second wellhead 212. In one embodiment, which can be combined with other embodiments, the horizontal plane extends through each of the plurality of joints 211-214 and through the rotatable joint 140.

According to the method of injecting fluid into the plurality of wellheads 211-214, the connection sub 150 is coupled to the second connection head 215B of the second wellhead 212 to inject fluid into the second well through the second wellhead 212. In one embodiment, which can be combined with other embodiments, the coupling of the connection sub 150 with the second connection head 215B includes disposing the connection sub 150 at least partially within a second sub 217B of the second connection head 215B and at least partially within the second lock ring assembly 216B. The coupling of the connection sub 150 with the second connection head 215B also includes engaging the connection sub 150 with the second lock ring assembly 216B. The first pumps 202 and the second pumps 205 are then used to pump the fluid through the second hose 130, through the wellhead hose 120, through the second wellhead 212, and into the second well.

Figure 2D:
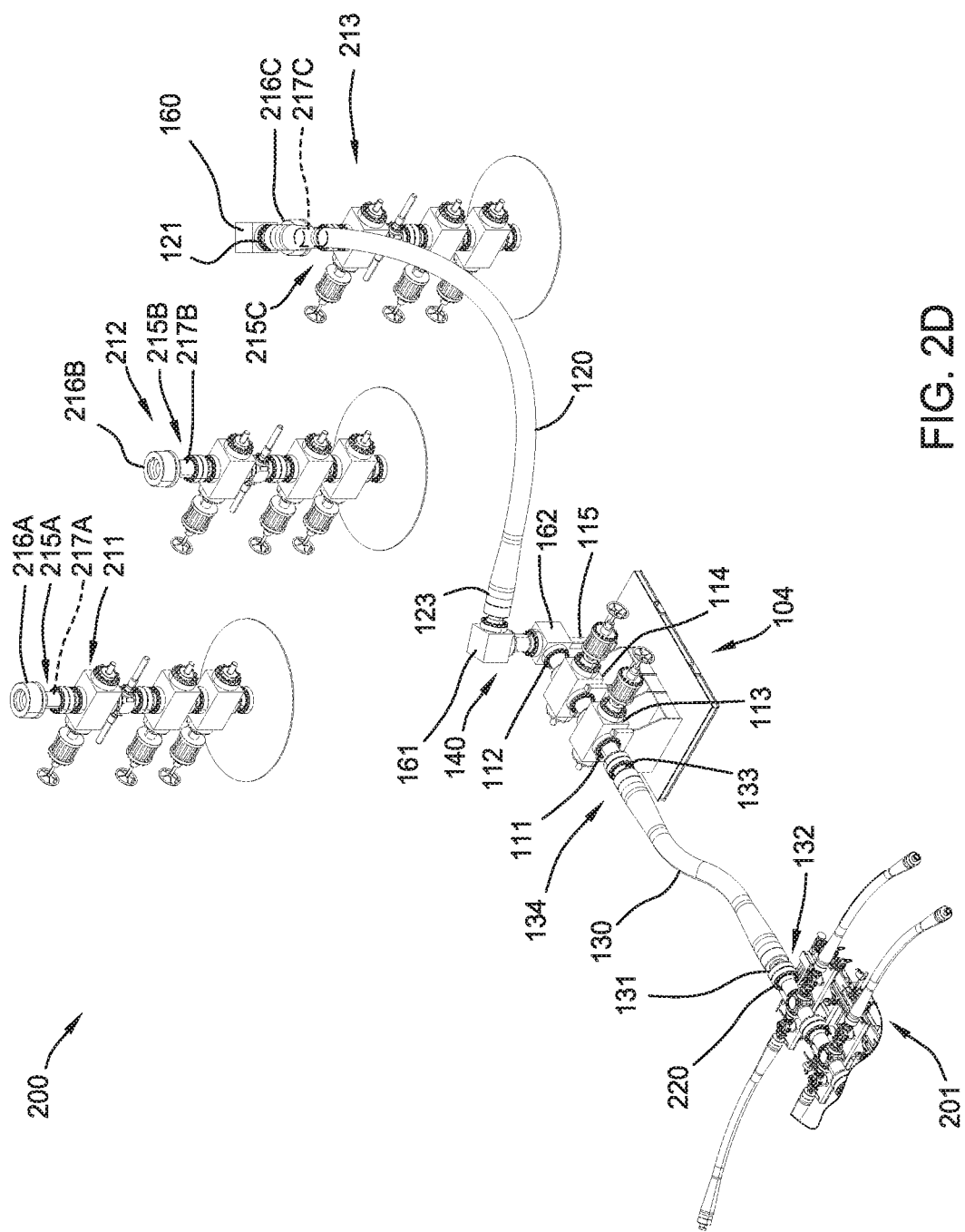
FIG. 2D is a partial schematic view of the fluid injection system illustrated in FIG. 2C with the connection sub coupled to a third wellhead, according to one implementation.

FIG. 2D is a partial schematic view of the fluid injection system 200 illustrated in FIG. 2C with the connection sub 150 coupled to the third wellhead 213, according to one implementation. According to a method of injecting fluid into the plurality of wellheads 212-214, the connection sub 150 is coupled to the third connection head 215C of the third wellhead 213 to inject fluid into the third well through the third wellhead 213. The first pumps 202 and the second pumps 205 are then used to pump the fluid through the second hose 130, through the wellhead hose 120, through the third wellhead 213, and into the third well.

According to the method, the connection sub 150 is decoupled from the second connection head 215B of the second wellhead 212 after pumping the fluid through the second wellhead 212 (as described in relation to FIG. 2C). The decoupling of the connection sub 150 from the second connection head 215B includes disengaging the connection sub 150 from the second lock ring assembly 216B. The decoupling of the connection sub 150 from the second connection head 215B also includes moving the connection sub 150 outside of the second lock ring assembly 216B and the second sub 217B. The connection conduit 160 and the connection sub 150 are then moved away from the second wellhead 212 and toward the third wellhead 213. While the connection conduit 160 and the connection sub 150 are moved toward the third wellhead 213, the wellhead hose 120 and the upper fluid conduit 161 are rotated relative to the lower fluid conduit 162 using the rotatable joint 140. The wellhead hose 120 and/or the upper fluid conduit 161 rotate by at least 15 degrees in the horizontal plane while the connection sub 150 and the connection conduit 160 are moved from the second wellhead 212 and to the third wellhead 213.

According to the method of injecting fluid into the plurality of wellheads 211-214, the connection sub 150 is coupled to the third connection head 215C of the third wellhead 213 to inject fluid into the third well through the third wellhead 213. In one embodiment, which can be combined with other embodiments, the coupling of the connection sub 150 with the third connection head 215C includes disposing the connection sub 150 at least partially within a third sub 217C of the third connection head 215C and at least partially within the third lock ring assembly 216C. The coupling of the connection sub 150 with the third connection head 215C also includes engaging the connection sub 150 with the third lock ring assembly 216C. The first pumps 202 and the second pumps 205 are then used to pump the fluid through the second hose 130, through the wellhead hose 120, through the third wellhead 213, and into the third well.

According to the method of injecting fluid into the plurality of wellheads 211-214, the connection sub 150 may be decoupled from the third wellhead 213, moved toward the fourth wellhead 214, and coupled to the fourth wellhead 214 to inject fluid into the fourth well through the fourth wellhead 214. In one embodiment, which can be combined with other embodiments, the crane 103 (illustrated in FIG. 1A) is used to move the connection conduit 160 and the connection sub 150 between the first wellhead 211, the second wellhead 212, the third wellhead 213, and the fourth wellhead 214.

Figure 2E:
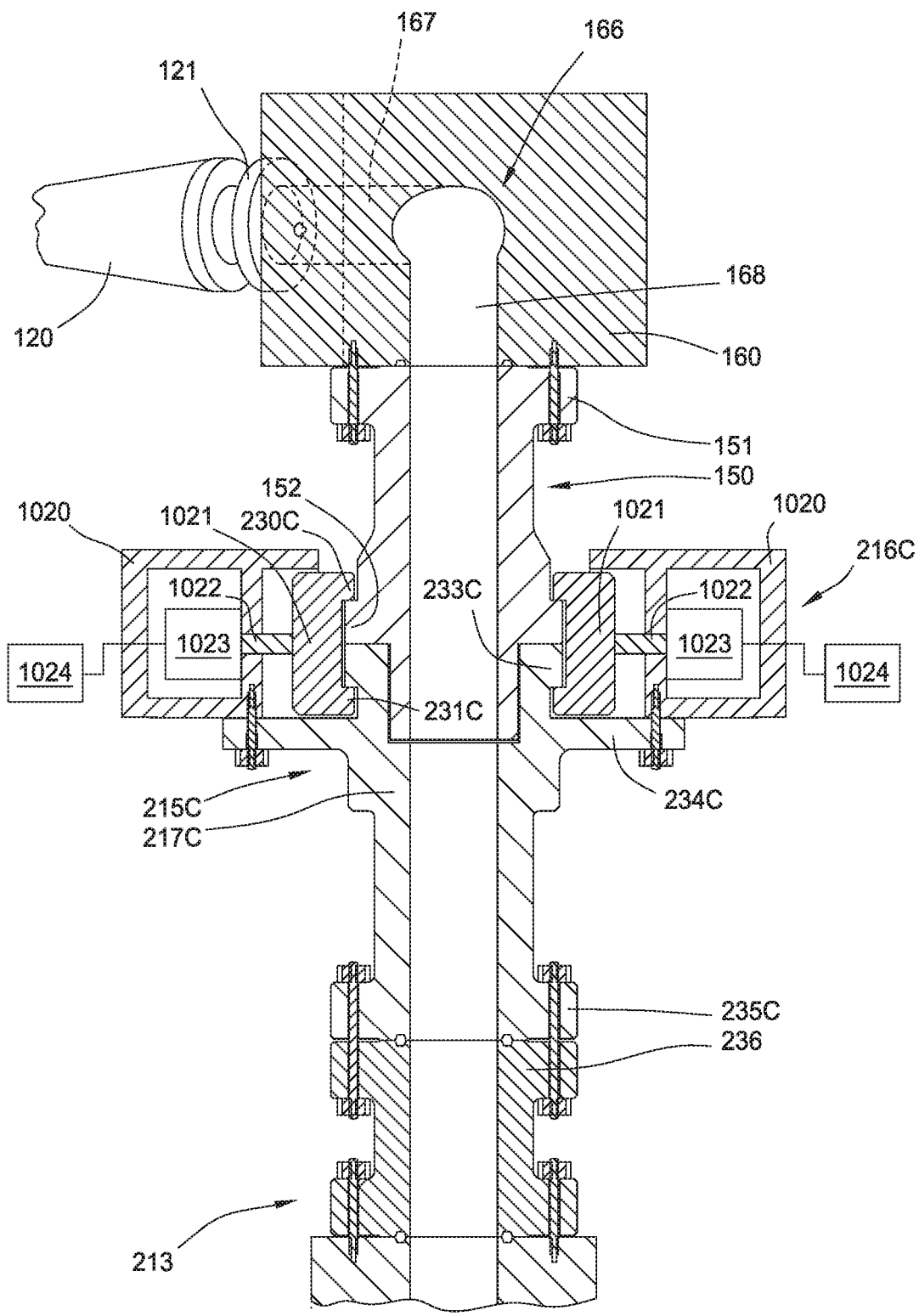
FIG. 2E is a schematic partial cross-sectional view of the connection sub coupled to the third wellhead, as illustrated in FIG. 2D, according to one implementation.

FIG. 2E is a schematic partial cross-sectional view of the connection sub 150 coupled to the third wellhead 213, as illustrated in FIG. 2D, according to one implementation. The connection conduit 160 includes a fluid opening 166. The fluid opening 166 includes a horizontal section 167 and a vertical section 168. The horizontal section 167 and the vertical section 168 intersect to form an L-shaped fluid opening 166. The present disclosure contemplates that the horizontal section 167 may be replaced with a second vertical section and/or that the vertical section 168 may be replaced with a second horizontal section. One or more of the horizontal section 167 and/or the vertical section 168 may be an oblique section disposed at an oblique angle.

The connection sub 150 includes a flange 151 coupled to the connection conduit 160. The present disclosure contemplates that connectors other than flanges may be used in place of the flanges described herein, such as the flange 151. The third lock ring assembly 216C includes one or more housing bodies 1020 disposed about a plurality of ring wedges 1021. In one example, four ring wedges 1021 are used. The ring wedges 1021 are separate segments that, when in contact form a ring. Each of the ring wedges 1021 includes an upper shoulder 230C and a lower shoulder 231C. The ring wedges 1021 are movable inward and outward to engage and disengage from a latch 152 of the connection sub 150. The ring wedges 1021 each include a piston rod 1022 coupled to an actuator 1023. Each actuator 1023 is connected to a power source 1024. The power sources 1024 supply power to the actuators 1023 to actuate the piston rods 1022 to move the ring wedges 1021 inward and outward. In one embodiment, which can be combined with other embodiments, the actuators 1023 include hydraulic chambers, each piston rod 1022 includes a piston head disposed in one of the hydraulic chambers, and the power sources 1024 are hydraulic fluid sources that supply and remove hydraulic fluid from the hydraulic chambers to bias the ring wedges 1021 inward and outward.

In the implementation shown, the latch 152 is a shoulder of the connection sub 150. When engaged with the latch 152, the upper shoulders 230C of the ring wedges 1021 are above and engaged with the latch 152 to couple the connection sub 150 to the third connection head 215C of the third wellhead 213. Ring wedges 1021 may be biased outward to disengage the upper shoulders 230C from the latch 152 such that the outer diameter of the latch 152 is lesser than the upper shoulders 230C such that the connection sub 150 may be moved upward and outside of the third lock ring assembly 216C. The third sub 217C includes a shoulder 233C engaged with the lower shoulders 231C of the ring wedges 1021 when the ring wedges 1021 are biased inward to engage the latch 152. The third sub 217C also includes a second shoulder 234C coupled to the one or more housing bodies 1020 of the third lock ring assembly 216C, and a lower flange 235C coupled to a flange 236 of the third wellhead 213. The present disclosure contemplates that latches other than a hydraulic latch, such as a mechanical latch, may be used in place of or in addition to the hydraulic latch 152 described. For example, power sources 1024 other than hydraulic power sources, such as electric power sources, may be used.

The latch 152 is used to couple the connection sub 150 to, and decoupled the connection sub 150 from, the plurality of wellheads 211-214, as described above.

Figure 3A:
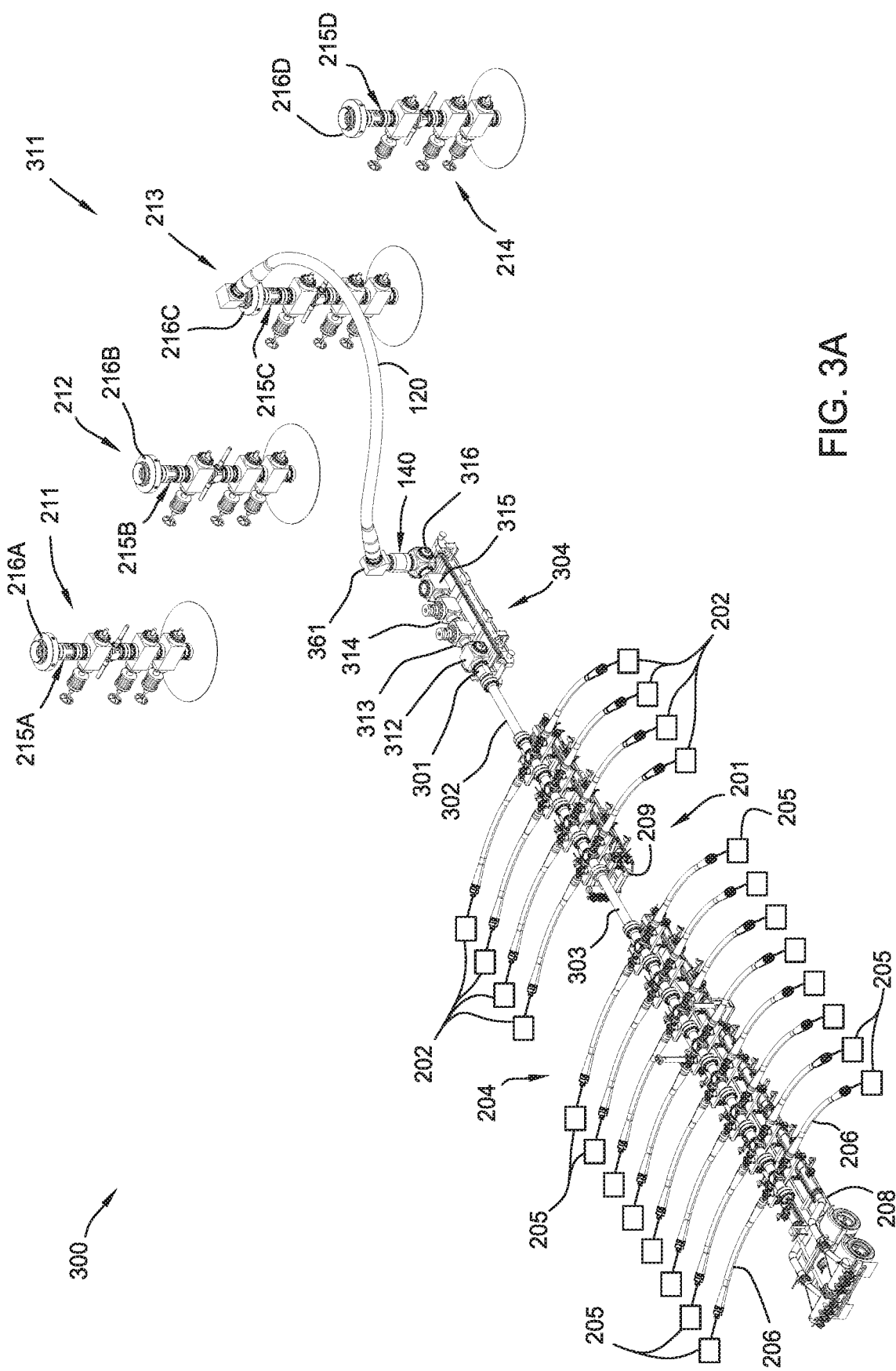
FIG. 3A is a schematic partial illustration a fluid injection system deployed at a wellhead site, according to one implementation.

FIG. 3A is a schematic partial illustration a fluid injection system 300 deployed at a wellhead site 311, according to one implementation. The second hose 130 is omitted from the fluid injection system 300 in the implementation shown in FIG. 3A. The fluid injection system 300 includes an instrumentation skid 304. The instrumentation skid 304 includes an upstream bleeder cross block 312, a first plug valve 313, a second plug valve 314, a swing check valve 315, and a downstream bleeder cross block 316. The upstream bleeder cross block 312 and the downstream bleeder cross block 316 facilitate relieving pressure in the fluid injection system 300 upstream and downstream of the valve string of the instrumentation skid 304. The rotatable joint 140 is coupled to and supported on the downstream bleeder cross block 316. In the implementation shown in FIG. 3A, the lower fluid conduit 162 is omitted. An upper fluid conduit 361 is coupled to the rotatable joint 140 above the rotatable joint 140. A spool 301, such as an instrumentation spool, is coupled to the upstream bleeder cross block 312. A first rigid pipe 302, such as an iron pipe or a steel pipe, is coupled between the spool 301 and the first manifold 201. A second rigid pipe 303 is coupled between the first manifold 201 and the second manifold 204.

Figure 3B:
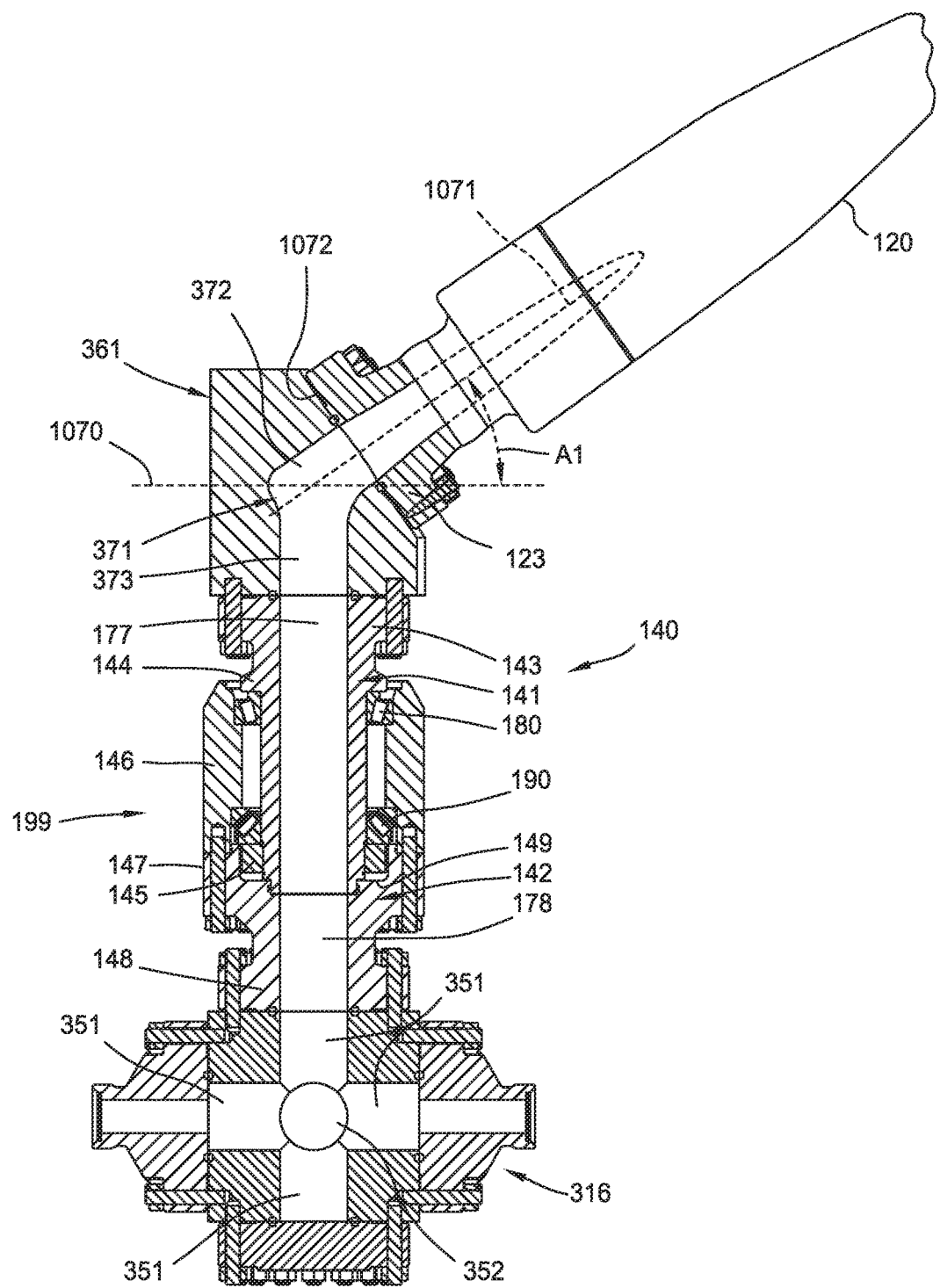
FIG. 3B is a schematic partial cross-sectional illustration of the swivel of the rotatable joint that is coupled to a valve block of the instrumentation skid.

FIG. 3B is a schematic partial cross-sectional illustration of the swivel 199 of the rotatable joint 140 that is coupled to a valve block of the instrumentation skid 304. The upper fluid conduit 361 includes a fluid opening 371. The fluid opening 371 includes an oblique section 372 and a vertical section 373. The oblique section 372 and the vertical section 373 intersect to form a V-shaped fluid opening 371. The downstream bleeder cross block 316 includes four fluid openings 351 extending along a vertical plane and a central fluid opening 352 extending horizontally to intersect the vertical plane. The oblique section 372 may be replaced with a second vertical section or a horizontal section, and/or that the vertical section 373 may be replaced with a second horizontal section. The oblique section 372 is disposed at an oblique angle A1. In one embodiment, which can be combined with other embodiments, the oblique section 372 is not perfectly horizontal relative to a horizontal plane 1070 or perfectly vertical relative to a vertical plane. The oblique section 372 is oriented at the oblique angle A1 relative to the horizontal plane 1070 such that the oblique section 372 includes a central axis 1071 disposed at the oblique angle A1 relative to the horizontal plane 1070. In one example, the oblique angle A1 is up to 40 degrees, such as within a range of 20 degrees to 40 degrees, such as 30 degrees. The oblique angle A1 facilitates reducing the bending of the wellhead hose 120 to couple to the upper fluid conduit 361. The wellhead hose 120 is coupled to a tapered outer surface 1072 of the upper fluid conduit 361. The tapered outer surface 1072 intersects the horizontal plane 1070 at a taper angle. The taper angle is equal to the oblique angle A1 subtracted from 90 degrees.

In the implementation shown in FIG. 3B, the lower fluid conduit 162 is omitted and the lower flange 148 is coupled directly to the downstream bleeder cross block 316 of the instrumentation skid 304. In the implementation shown in FIG. 3B, the second hose 130 is also omitted.

Benefits of the present disclosure include quickly and effectively establishing sequential connections to a plurality of wellheads using a single wellhead hose, reduced line lengths for wellhead hoses and second hoses, reduced numbers and complexities of connection points for wellhead connection systems to pump high pressure fluid into wells (such as wells of a multi-well pad using zipper frac), reduced complexity, and reduced numbers of lines. Benefits of the present disclosure also include increased efficiency, reduced costs, reduced operational times, decreased mobilization of resources, and simplicity in design and operations.

Aspects of the present disclosure include at least the wellhead connection apparatus 101, the wellhead connection system 100, the fluid injection system 200, the fluid injection system 110, the fluid injection system 300, the connection sub 150, the rotatable joint 140, the upper set of bearings 180, and the lower set of bearings 190. It is contemplated that one or more of the aspects disclosed herein may be combined. Moreover, it is contemplated that one or more of these aspects may include some or all of the aforementioned benefits.

As an example, aspects of the connection sub 150 (such as the latch 152) and aspects of the rotatable joint 140 (such as the upper set of bearings 180, the lower set of bearings 190, the upper sub 141, the lower sub 142, and the bearing housing 146) may be combined to facilitate using a single wellhead hose 120 to facilitate sequentially coupling to and decoupling from a plurality of wellheads 211-214 to pump fluid through the wellheads 211-214. Aspects of the rotatable joint 140 also facilitate modularity of the wellhead connection system 100 as the rotatable joint 140 may rotate 360 degrees and allow the wellhead hose 120 to swing 360 degrees about the rotatable joint 140 to establish connections to wellheads.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The present disclosure also contemplates that one or more aspects of the embodiments described herein may be substituted in for one or more of the other aspects described. The scope of the disclosure is determined by the claims that follow.

The invention claimed is:

1. A flexible wellhead connection apparatus, comprising:
   a flexible wellhead hose comprising a first end and a second end;
   a connection sub coupled to the first end of the flexible wellhead hose through a connection conduit;
   a rotatable joint coupled to the second end of the flexible wellhead hose through an upper fluid conduit; and
   a flexible second hose and a lower fluid conduit coupled to the rotatable joint, the flexible second hose comprising a first end and a second end, wherein the first end of the flexible second hose is coupled to a fluid source and the second end of the flexible second hose is fluidly connected to the lower fluid conduit.

2. The flexible wellhead connection apparatus of claim 1, wherein a body of the flexible wellhead hose does not include any hard metal sections.

3. The flexible wellhead connection apparatus of claim 1, wherein the rotatable joint comprises a swivel.

4. The flexible wellhead connection apparatus of claim 3, wherein the swivel comprises:
   a lower sub, the lower sub comprising a lower flange coupled to the lower fluid conduit and a fluid opening;
   an upper sub, the upper sub comprising an upper flange coupled to the upper fluid conduit and a fluid opening; and
   one or more bearings disposed between the upper sub and the lower sub, wherein the upper sub and the upper fluid conduit are rotatable relative to the lower sub.

5. The flexible wellhead connection apparatus of claim 4, wherein the one or more bearings are disposed within a bearing housing coupled to the lower sub and disposed above the lower sub.

6. The flexible wellhead connection apparatus of claim 5, wherein the connection sub comprises a latch.

7. A flexible wellhead connection system, comprising:
   a trailer;
   a crane mounted on the trailer;
   a flexible wellhead hose comprising a first end and a second end;
   a connection sub coupled to the first end of the flexible wellhead hose through a connection conduit;
   a rotatable joint coupled to the second end of the flexible wellhead hose through an upper fluid conduit; and
   a flexible second hose and a lower fluid conduit coupled to the rotatable joint, the flexible second hose comprising a first end and a second end, wherein the first end of the flexible second hose is coupled to a fluid source and the second end of the flexible second hose is fluidly connected to the lower fluid conduit.

8. The flexible wellhead connection system of claim 7, wherein a body of the flexible wellhead hose does not include any hard metal sections.

9. The flexible wellhead connection system of claim 7, wherein the connection sub is coupled to a wellhead.

10. The flexible wellhead connection system of claim 7, wherein the second end of the flexible second hose is fluidly connected to the lower fluid conduit through at least an instrumentation skid.

11. The flexible wellhead connection system of claim 7, wherein the rotatable joint comprises a swivel.

12. The flexible wellhead connection system of claim 11, wherein the swivel comprises:
   a lower sub, the lower sub comprising a lower flange coupled to the lower fluid conduit and a fluid opening;
   an upper sub, the upper sub comprising an upper flange coupled to the upper fluid conduit and a fluid opening; and
   one or more bearings disposed between the upper sub and the lower sub, wherein the upper sub and the upper fluid conduit are rotatable relative to the lower sub.

13. The flexible wellhead connection system of claim 12, wherein the one or more bearings are disposed within a bearing housing coupled to the lower sub and disposed above the lower sub.

14. The flexible wellhead connection system of claim 13, wherein the connection sub comprises a latch.

15. A method of injecting fluid into a plurality of wellheads, comprising:
   coupling a connection sub coupled to a first end of a flexible wellhead hose of a wellhead connection apparatus to a first wellhead, wherein the wellhead connection apparatus further comprises:
      the connection sub coupled to the first end of the flexible wellhead hose through a connection conduit;
      a rotatable joint coupled to a second end of the flexible wellhead hose through an upper fluid conduit; and
      a flexible second hose and a lower fluid conduit coupled to the rotatable joint, the flexible second hose comprising a first end and a second end, wherein the first end of the flexible second hose is coupled to a fluid source and the second end of the flexible second hose is fluidly connected to the lower fluid conduit;
   pumping fluid through the flexible wellhead hose and into the first wellhead;
   decoupling the connection sub from the first wellhead;
   moving the connection sub toward a second wellhead, the moving the connection sub comprising rotating the rotatable joint coupled to the second end of the wellhead hose;
   coupling the connection sub to the second wellhead; and
   pumping fluid through the flexible wellhead hose and into the second wellhead.

16. The method of claim 15, wherein the rotating the rotatable joint comprises rotating a swivel of the rotatable joint, and the swivel comprises a lower sub, an upper sub, and one or more bearings disposed between the upper sub and the lower sub, wherein the rotating the swivel of the rotatable joint comprises rotating the upper sub relative to the lower sub.

17. The method of claim 16, wherein the one or more bearings are disposed within a bearing housing coupled to the lower sub and disposed above the lower sub.

18. The method of claim 15, wherein the coupling the connection sub to the first wellhead comprises actuating a latch to engage the first wellhead.

* * * * *